No. 777,112. PATENTED DEC. 13, 1904.
E. KRATOCHVIL.
APPARATUS FOR CLEANSING THE GASES OF BLAST FURNACES,
GENERATORS, &c.
APPLICATION FILED FEB. 21, 1903.
NO MODEL.

Witnesses:
J. S. Noble
L. Waldman

Inventor,
Emil Kratochvil
by P. Singer
Att'y.

No. 777,112. Patented December 13, 1904.

UNITED STATES PATENT OFFICE.

EMIL KRATOCHVIL, OF KRÁLŮV DVŮR, AUSTRIA-HUNGARY.

APPARATUS FOR CLEANSING THE GASES OF BLAST-FURNACES, GENERATORS, &c.

SPECIFICATION forming part of Letters Patent No. 777,112, dated December 13, 1904.

Application filed February 21, 1903. Serial No. 144,470. (No model.)

*To all whom it may concern:*

Be it known that I, EMIL KRATOCHVIL, a subject of the Emperor of Austria-Hungary, residing at Králův Dvůr, in the Kingdom of Bohemia and Empire of Austria-Hungary, have invented a new and useful Apparatus for Cleansing the Gases of Blast-Furnaces, Generators, Smoke and Chimney Gases, and the Like from their Greasy and other Ingredients, of which invention the following is a specification.

My invention relates to improvements in apparatus for cleansing the gases in a simple and cheap way, so as to render it applicable for the use of gas-engines or for the purpose of abating smoke. I attain these objects by the mechanism illustrated as an example in the accompanying drawings, in which—

Figure 1:
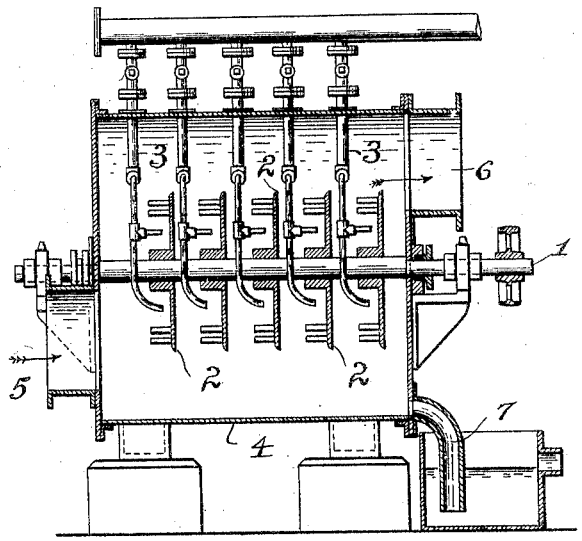
Figure 2:
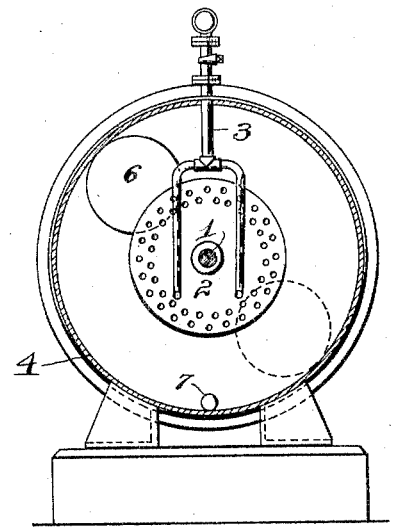

Figure 1 is an axial vertical section of the machine, and Fig. 2 a vertical cross-section of the same machine.

1 is a turning shaft carrying a number of water-dispersing disks or the like. Water is conducted on through pipes 3, striking them in one or several points near their centers and from the side, it being dispersed by the centrifugal force. The whole is inclosed in a casing 4, the shaft being turned from outside.

The gases to be cleansed enter by 5 and escape by 6 after having been thoroughly mixed with the dispersed water and washed off in the casing 4, from which the dirty water flows away by the tube 7.

I am aware that prior to my invention gas-cleansing machines have been made with water-dispersing rotary devices. I therefore do not claim such a combination broadly; but What I do claim as my invention, and desire to secure by Letters Patent, is—

In a gas-cleansing apparatus the combination of a suitable casing, a horizontal rotatable shaft through said casing, a series of disks on said shaft, a plurality of pins on the faces of said disks, a water-supply pipe, branches leading from said pipe having nozzles directed toward said disks, a water-outlet for said casing and gas inlet and outlets in said casing.

In testimony whereof I affix my signature in presence of two witnesses.

EMIL KRATOCHVIL.

Witnesses:
 ARTHUR SCHWEZ,
 LADISLAV VOJÁČEK.